US008840057B2

(12) United States Patent
Moret

(10) Patent No.: US 8,840,057 B2
(45) Date of Patent: Sep. 23, 2014

(54) HYBRID AIRCRAFT HAVING A ROTARY WING

(71) Applicant: EUROCOPTER, Marignane (FR)

(72) Inventor: Robin Moret, Salon de Provence (FR)

(73) Assignee: Airbus Helicopters, Marignane Cedex (FR)

( * ) Notice: Subject to any disclaimer, the term of this patent is extended or adjusted under 35 U.S.C. 154(b) by 9 days.

(21) Appl. No.: 13/628,525

(22) Filed: Sep. 27, 2012

(65) Prior Publication Data

US 2013/0082135 A1 Apr. 4, 2013

(30) Foreign Application Priority Data

Sep. 29, 2011 (FR) ...................................... 11 02947

(51) Int. Cl.
*B64C 27/22* (2006.01)
*B64C 27/26* (2006.01)
*B64D 35/04* (2006.01)
*B64C 27/82* (2006.01)
*B64C 27/12* (2006.01)

(52) U.S. Cl.
CPC ................ *B64C 27/26* (2013.01); *B64C 27/82* (2013.01); *B64C 27/12* (2013.01)
USPC .................. 244/6; 244/7 R; 244/7 A; 244/60

(58) Field of Classification Search
USPC ............................. 244/6, 7 R, 7 A, 17.11, 60
See application file for complete search history.

(56) References Cited

U.S. PATENT DOCUMENTS 2,665,859 A * 1/1954 Papadakos .................... 244/7 R
2,698,147 A * 12/1954 Hovgard ....................... 244/7 R
2,940,693 A * 6/1960 Hislop ........................ 244/17.11
(Continued)

FOREIGN PATENT DOCUMENTS

CN 1098688 A 2/1995
EP 2105378 A1 9/2009
(Continued)

OTHER PUBLICATIONS

Search Report and Written Opinion; Application No. FR 1102947; dated May 25, 2012.
(Continued)

*Primary Examiner* — Tien Dinh
*Assistant Examiner* — Steven Hawk
(74) *Attorney, Agent, or Firm* — Brooks Kushman P.C.

(57) ABSTRACT

An aircraft (1) having a fuselage (2), a power plant (10), a rotary wing (15) having at least one main rotor (16), and a fixed wing (20) comprising two half-wings (21, 22) extending on either side of the fuselage (2). The aircraft (1) also has at least two propulsive propellers (30) on either side of the fuselage (2). Each is positioned on respective ones of the half-wings (21, 22), and an anti-torque and yaw-control tail rotor (35). A transmission system (40) connects the power plant (10) to each main rotor (16) and the tail rotor (35). The transmission system (40) connects the power plant (10) to each propeller (30) via a respective differential mechanism (50) that is controllable on request so that each propeller (30) can be driven in cruising flight and need not be driven in rotation by the power plant (10) on the ground or while hovering.

19 Claims, 1 Drawing Sheet

(56) References Cited

U.S. PATENT DOCUMENTS

| | | | |
|---|---|---|---|
| 3,105,659 A * | 10/1963 | Stutz | 244/7 R |
| 3,385,537 A * | 5/1968 | Lichten et al. | 244/6 |
| 3,448,946 A * | 6/1969 | Nagatsu | 244/17.19 |
| 3,458,160 A * | 7/1969 | Marchetti | 244/6 |
| 3,540,680 A * | 11/1970 | Peterson | 244/17.19 |
| 3,563,496 A * | 2/1971 | Zuck | 244/7 A |
| 3,647,315 A | 3/1972 | Rostad et al. | |
| 3,698,666 A * | 10/1972 | Monti | 244/7 A |
| 3,977,812 A * | 8/1976 | Hudgins | 416/123 |
| 4,783,023 A * | 11/1988 | Jupe | 244/6 |
| 6,098,921 A * | 8/2000 | Piasecki | 244/17.19 |
| 6,467,726 B1 * | 10/2002 | Hosoda | 244/60 |
| 6,974,105 B2 * | 12/2005 | Pham | 244/6 |
| 7,137,589 B2 * | 11/2006 | Arata | 244/6 |
| 8,052,094 B2 * | 11/2011 | Roesch | 244/177 |
| 8,070,089 B2 | 12/2011 | Ferrier | |
| 8,113,460 B2 * | 2/2012 | Roesch | 244/6 |
| 8,170,728 B2 * | 5/2012 | Roesch | 701/3 |
| 8,181,901 B2 * | 5/2012 | Roesch | 244/6 |
| 2002/0011539 A1 * | 1/2002 | Carter, Jr. | 244/6 |
| 2003/0042357 A1 * | 3/2003 | Van Cor | 244/60 |
| 2005/0045762 A1 * | 3/2005 | Pham | 244/7 R |
| 2005/0151001 A1 * | 7/2005 | Loper | 244/6 |
| 2006/0169834 A1 * | 8/2006 | Arata | 244/6 |
| 2008/0294305 A1 * | 11/2008 | Roesch | 701/3 |
| 2009/0321554 A1 * | 12/2009 | Roesch | 244/6 |
| 2010/0065677 A1 * | 3/2010 | Ferrier | 244/6 |
| 2010/0219286 A1 * | 9/2010 | Roesch | 244/6 |
| 2010/0224720 A1 * | 9/2010 | Roesch | 244/12.3 |

FOREIGN PATENT DOCUMENTS

| | | |
|---|---|---|
| EP | 2148814 A1 | 2/2010 |
| GB | 215366 A | 4/1925 |
| GB | 895590 A | 5/1962 |
| GB | 2197629 A1 | 5/1988 |

OTHER PUBLICATIONS

KR Notice of the Reason for Rejection Dated Nov. 25, 2013. Application No. 2012-0109220, Applicant EUROCOPTER, 2 pages.

* cited by examiner

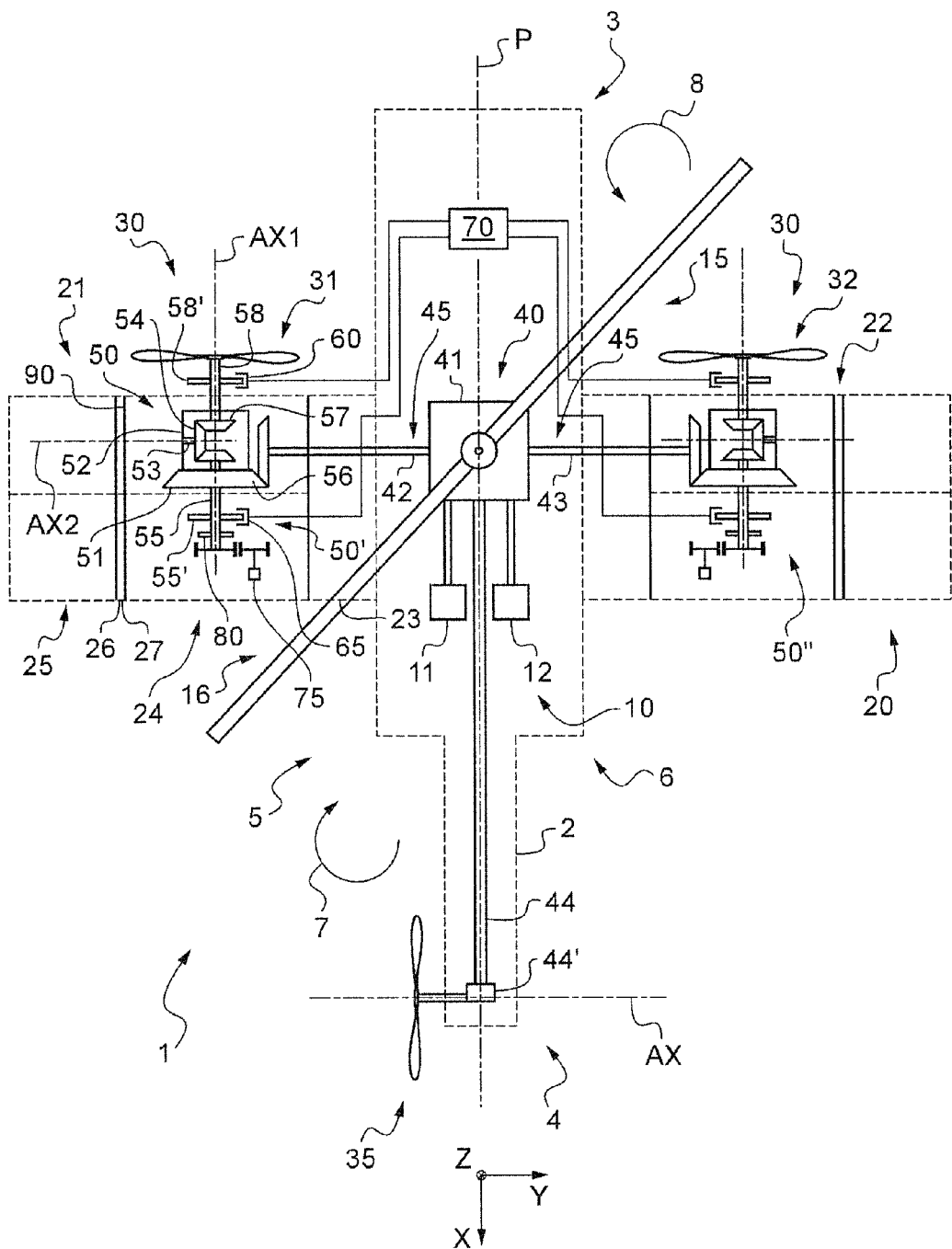

HYBRID AIRCRAFT HAVING A ROTARY WING

CROSS REFERENCE TO RELATED APPLICATIONS

This application claims priority to French Patent Application No. FR 11 02947 filed on Sep. 29, 2011, the disclosure of which is incorporated in its entirety by reference herein.

BACKGROUND OF THE INVENTION (1) Field of the Invention

The present invention relates to a hybrid aircraft having a rotary wing and suitable for traveling long distances at high speed.

This advanced rotorcraft design seeks, at reasonable cost, to combine the effectiveness in vertical flight of a conventional helicopter with the high travel speed performance made possible by using propulsive propellers and modern engines.

(2) Description of Related Art

In order to understand clearly the object of the invention, it is appropriate to recall the main kinds of flying machine that correspond to aircraft and to rotorcraft.

The term "rotorcraft" designates any aircraft in which lift is provided in full or in part by at least one rotary wing. The rotary wing usually comprises at least one rotor of large diameter and of axis that is substantially vertical when the aircraft is standing on the ground.

The rotorcraft category includes several distinct types.

Firstly, there is the helicopter in which at least one main rotor under drive from an appropriate engine, serves to provide both lift and propulsion.

A helicopter may have two lift rotors providing the aircraft both with lift and with propulsion. The two rotors may be arranged one behind the other or they may be on the same axis.

There is also the autogyro, which is a rotorcraft in which the rotor does not receive power, but provides lift by autorotation under the effect of the forward speed of the aircraft.

There is also the gyrodyne, which is a rotorcraft that is intermediate between the helicopter and the autogyro, in which the rotor provides only lift. The rotor is normally driven by a power plant during stages of take-off, hovering or vertical flight, and landing, like a helicopter. A gyrodyne also has an additional propulsion system that is essentially different from the rotor assembly. In forward flight, the rotor continues to provide lift, but solely in autorotation mode, i.e. without power being transmitted to said rotor.

There is also the compound rotorcraft, which takes off and lands like a helicopter, while performing cruising flight like an autogyro.

Of those various rotorcraft formulae, the helicopter is the simplest, such that it is the most widespread in spite of the fact that the maximum forward speed of a helicopter is about 300 kilometers per hour (km/h) which is slow and less than the speed that can be envisaged with formulae of the compound or convertible types, that are technically more complex and more expensive.

Another novel formula is known as the "hybrid" helicopter and is described in document EP 2 148 814.

Document EP 2 105 378 describes an aircraft having a rotary wing, two propulsive propellers, and a stabilizer surface at the front of the fuselage.

The arrangement of propellers enables the sides of the aircraft fuselage to be left free, e.g. for loading and unloading passengers. In addition, those propellers are arranged at the rear of the aircraft, thus serving to minimize the amount of propeller-generated noise that is perceived by passengers.

It should also be observed that the aircraft does not have a tail boom or a vertical tail fin, thereby serving at least to minimize the phenomenon known as "tail shake".

In another aspect, the stabilizer surface placed at the front of the aircraft serves at least to minimize the "attitude hump" phenomenon (from the French: "bosse d'assiette").

A rotorcraft is also known that has two main rotors on a common axis acting together to provide the aircraft with lift and not requiring an anti-torque device.

Such a rotorcraft also includes a propeller situated at the rear end of the aircraft to provide the aircraft with propulsion in cruising flight, and a declutching system enabling the propulsive propeller to be driven or not.

That rotorcraft thus possesses a system for transmitting power to the main rotors that is relatively complex.

In addition, the propeller is potentially situated in the wake of the fuselage and of a main rotor, which can give rise to noise and to the phenomenon known as "tail shake".

Furthermore, a rotorcraft is known having a main rotor that provides the aircraft with lift in hovering flight, with all or part of its lift in cruising flight, and also with some of its propulsion in cruising flight.

The rotorcraft also has a tail rotor that provides an anti-torque function and a function of controlling the aircraft in yaw, a fixed wing that provides additional lift in cruising flight, and a non-declutchable propeller situated at the rear end of the aircraft for contributing to propulsion.

It should be observed in particular that it is not possible in hovering flight to stop the propeller from rotating, that propeller then requiring power, even when providing no thrust.

Document U.S. Pat. No. 3,448,946 proposes a compound rotorcraft with a propulsive tail rotor and an anti-torque tail rotor.

Document U.S. Pat. No. 3,105,659 describes a two-mode aircraft operating both in helicopter mode and in autogyro mode.

Document US 2002/0011539 presents an aircraft having propulsive propellers that provide an anti-torque function.

Document CN 1 098 688 presents an aircraft having a differential mechanism.

Also known are the following documents: U.S. Pat. No. 2,665,859 A; US 2005/151001 A1; GB 215 366 A; GB 2 197 629 A; and GB 895 590 A.

BRIEF SUMMARY OF THE INVENTION

An object of the present invention is thus to propose a rotary wing aircraft tending to limit the above-mentioned drawbacks as much as possible.

According to the invention, the aircraft comprises a fuselage, a power plant, a rotary wing having at least one main rotor providing at least part of the lift of the aircraft, a fixed wing providing at least part of the lift of the aircraft in cruising flight, the fixed wing comprising two half-wings extending on either side of the fuselage, the aircraft including at least two propulsive propellers situated on either side of the fuselage and each positioned on a respective half-wing, the aircraft including an anti-torque and yaw-control tail rotor.

Furthermore, the aircraft includes a transmission system connecting the power plant to each main rotor and to the tail rotor to drive each main rotor and the tail rotor continuously in flight, the transmission system connecting the power plant to each propeller via a differential mechanism that is controllable on request by a pilot or an autopilot mechanism so that each propeller may be driven in cruising flight and need not be driven in rotation by the power plant on the ground, and/or in hovering flight.

The term "cruising flight" is used to mean a stage of flight that is performed with a non-zero longitudinal speed.

Conversely, the term "hovering flight" is used to mean a stage of flight that takes place with zero longitudinal speed.

Thus, yaw control and the anti-torque function are provided in particular by the tail rotor.

The lift of the aircraft is provided by the rotary wing and by the fixed wing. It can be understood that the contribution of the fixed wing to the lift increases with increasing forward speed of the aircraft.

Furthermore, the propulsion of the aircraft can be provided by the rotary wing and by the propellers.

According to the invention, a differential mechanism enables the propellers to be driven in rotation or not at the request of a pilot or an autopilot system.

It thus becomes possible in particular to drive the propellers in cruising flight so as to reach a high forward speed, for example, and to avoid driving the propellers, in particular when on the ground and/or in hovering flight.

The invention thus makes it possible to present one or more of the following advantages compared with a conventional helicopter:

the capacity to fly at high speed because of the propeller propulsion and because of the aerodynamic load taken off the rotary wing by the fixed wing;

the capacity to accelerate and to slow down during level flight with an attitude of substantially zero degrees, because of the propellers;

the capacity to climb at very high vertical speed;

the capacity to accommodate large load factors because of the fixed wing;

the capacity to vary attitude while hovering if the propellers are engaged; and better overall aerodynamic lift to drag ratio because of the fixed wing.

Furthermore, by enabling the propellers to be stopped while on the ground, the differential mechanism minimizes the noise that is emitted while on the ground, and minimizes any risk of accident for people on the ground close to the aircraft, and in particular for passengers seeking to embark or disembark while the rotary wing continues to rotate.

By enabling the propellers to be stopped while in hovering flight, the differential mechanism minimizes the power required and the noise given off, and enables the crew on board to work from a side opening in the fuselage of the helicopter.

It should also be observed that the propeller pitch control system can be simplified insofar as it does not need to be very reactive and it does not need to be redundant. Since the propellers do not contribute to controlling the aircraft in yaw, or participate in controlling the aircraft in yaw but only in addition to the tail rotor, the propeller pitch control system need not be particularly fast and reliable. By way of example, the propeller pitch control system may be limited to a conventional propeller pitch actuator as on an airplane.

Similarly, the dimensioning of the spacing between the propellers is independent of requirements for performing the anti-torque function, since said function is performed at least for the most part by the tail rotor. Thus, there is no need to seek an only moderately satisfactory compromise when selecting the positions of the propellers relative to the fuselage and when selecting the dimensions of the wing that carries them.

Furthermore, each propeller may be optimized for propulsion, without any compromise to enable a "reverse" mode of operation for contributing to the anti-torque function.

The aircraft may also include one or more of the following additional characteristics.

Thus, the differential mechanism of a particular propeller may comprise:

an inlet gearwheel driven by the power plant via a lateral portion of the transmission system, the inlet gearwheel being secured to a shell carrying at least one planet gear;

an idler shaft passing through the inlet gearwheel, the idler shaft being constrained to rotate with an inlet sun gear meshing with the planet gear and being free to rotate relative to the inlet gear;

a propeller shaft driving the particular propeller, the propeller shaft being constrained to rotate with an outlet sun gear, the outlet sun gear meshing with the planet gear; and a propeller brake for braking the propeller shaft and an inlet brake for braking the idler shaft.

This mechanism is thus particularly simple and easy to implement.

In a first utilization of the differential mechanism, by braking the propeller shaft and releasing the idler shaft, the transmission system can drive the idler shaft while the propeller is stopped.

In the absence of energy-consuming members, the power consumed by the idler shaft is negligible. Conversely, the power delivered by the power plant to the rotary wing and to the tail rotor is maximized, even if the drive systems are nevertheless continuously driving a member that is arranged on the fixed wing, specifically the idler shaft in this example.

In a second utilization of the differential mechanism, by braking the idler shaft while releasing the propeller shaft, the transmission system can drive the propeller, with the idler shaft being stopped.

To this end, the aircraft may include control means for:

controlling the propeller brake so as to prevent the propeller shaft from rotating and controlling the inlet brake so as to release the idler shaft in order to perform a function of stopping the propeller while allowing the idler shaft to be driven by the lateral portion; and controlling the propeller brake to release the propeller shaft and controlling the inlet brake to block the idler shaft so as to perform a function of transmitting rotary motion from the lateral portion to the propeller shaft in order to rotate the propeller.

The control means may be a lever having two positions enabling one or the other of the above-mentioned utilizations of the differential mechanism to be requested.

In a first variant, the idler shaft meshes with an accessory gearbox.

The accessory gearbox serves to generate electrical, hydraulic, pneumatic, or other power by means of rotation. For example, the accessory gearbox may activate a mechanism for folding a half-wing, or indeed a winch integrated in a half-wing, for example.

The accessory gearbox may be an electrical member suitable for generating electricity as a result of the idler shaft rotating.

In a second variant, the idler shaft is connected to a system for storing kinetic energy in order to benefit from additional power in the event of an engine failure.

Such systems are known, in particular in the automotive field, which systems are implemented on the wheels of racing cars.

It can be understood that each idler shaft may also mesh with a gearbox and be connected to a system for storing kinetic energy.

In another aspect, the transmission system may include a central portion connected to the tail rotor and to the rotary wing, and one lateral portion per propeller connecting said central portion to a differential mechanism of a propeller, and the assemblies comprising the half-wings with their propellers, lateral portions, and differential mechanisms are removable.

It is then possible to transform the aircraft that is capable of passing from a rotary wing configuration to a fixed wing configuration into a configuration that corresponds to a conventional helicopter.

Furthermore, the transmission system may connect the power plant:

to a first propeller via a first differential mechanism controllable by a pilot so that said first propeller can be driven by the power plant in cruising flight and in hovering flight, and need not be driven in rotation by the power plant on the ground or in hovering flight; and to a second propeller via a second differential mechanism controllable by a pilot so that said second propeller can be driven by the power plant in cruising flight and in hovering flight, and need not be driven in rotation by the power plant on the ground or in hovering flight.

Thus, the power plant may:

in a first mode of operation, drive the rotary wing, the tail rotor, and the propellers in cruising flight in order to reach high speeds;

in a second mode of operation, drive the rotary wing and the tail rotor on the ground with the propellers being stopped, in particular in order to protect people moving in the vicinity of the aircraft and to limit the noise generated by the aircraft.

Furthermore, in a third mode of operation, in hovering flight, the power plant drives the rotary wing and the tail rotor while the propellers are stopped.

The capacity to stop the propellers in hovering flight may thus limit at least one of the following drawbacks:

sound level;

the risks of propellers rupturing while landing on water or on non-prepared landing grounds;

the risks of the propellers rupturing when landing on deeply sloping terrain;

the risks of the propellers rupturing in the event of the landing gear of the aircraft collapsing; and the capacity to make use of optional equipment, e.g. a winch, via a side door in the fuselage, while hovering and without any risk of interference with the propellers.

Furthermore, the capacity to stop the propellers in hovering flight can optimize the power efficiency of the aircraft while hovering, compared with an aircraft that includes propellers that cannot be declutched.

In a fourth mode of operation, the power plant, while hovering, drives the rotary wing, the tail rotor, and one of the propellers, while the other propeller is stopped.

Thus, the propeller that is driven in rotation while hovering co-operates with the tail rotor to compensate the torque exerted by the main rotor of the rotary wing on the fuselage.

This leads to optimized power efficiency for the anti-torque function.

Finally, each half-wing extends transversely from said fuselage from a root zone towards an end zone passing via an intermediate zone carrying a propeller, the end zone being connected to the intermediate zone by a controllable hinge so that the end zone can be moved and directed towards the ground in hovering flight in order to minimize the area of the fixed wing having the air passing through the rotary wing impacting thereagainst and so as to protect the propeller from coming into contact with the ground.

Under such circumstances, the loss of lift that results from the wing during hovering flight is minimized.

It should be observed that the end zone of the wing may also serve as a support leg in the so-called "folded" position, the end zone being moved so as to be directed towards the ground in this folded position.

The hinge may be operated by a motor powered by the accessory gearbox that co-operates with an idler shaft of the differential mechanism.

BRIEF DESCRIPTION OF THE SEVERAL VIEWS OF THE DRAWINGS

The invention and its advantages appear in greater detail from the following description of examples given by way of illustration and with reference to the sole accompanying FIGURE.

It should be observed that three mutual orthogonal directions X, Y, and Z are shown in the FIGURE.

The first direction X is said to be "longitudinal". The term "longitudinal" relates to any direction parallel to the first direction X.

The second direction Y is said to be "transverse". The term "transverse" relates to any direction parallel to the second direction Y.

Finally, the third direction Z is said to be "in elevation". The term "in elevation" relates to any direction parallel to the third direction Z.

DETAILED DESCRIPTION OF THE INVENTION

The FIGURE shows an aircraft 1 having a fuselage 2.

The fuselage 2 extends longitudinally from a nose 3 to a rear end 4 along an anteroposterior plane of symmetry P, transversely from a first side 5 to a second side 6, and in elevation from a bottom portion 7 to a top portion 8.

The aircraft also includes a rotary wing 15 above the top portion 8 of the fuselage, the rotary wing comprising at least one main rotor 16.

The aircraft is also provided with a tail rotor 35 arranged at the rear end 4. The tail rotor 35 rotates about a transverse axis AX in particular in order to counter the torque exerted by the main rotor 16 on the fuselage 2 and in order to control the aircraft in yaw.

Furthermore, the aircraft 1 has a fixed wing 20, this wing comprising two half-wings 21 and 22 extending on either side of the fuselage, e.g. in a transverse direction.

Each half-wing 21, 22 carries a propulsive propeller 30, the first half-wing 21 carrying a first propeller 31 and the second half-wing 22 carrying a second propeller 32.

Thus, going transversely and away from the fuselage 2, each half-wing 21, 22 presents a root zone 23, an intermediate zone 24 carrying a propeller 30, and possibly also a propeller nacelle, and an end zone 25.

The end zone 25 is optionally connected to the intermediate zone 24 by a hinge 26. This hinge may be controlled by a motor 27 so that the end zone 25 is moved so as to be directed on request towards the ground during hovering flight.

In the resulting folded position, the area of the wing that is struck by the wash passing through the rotary wing is minimized. As a result the loss of lift caused by the fixed wing is minimized while hovering.

It can be understood that the end zone may present the portion of the half-wing that extends between the propeller nacelle and the wing tip.

In order to drive rotation of the rotary wing, of the tail rotor, and of the propellers, the aircraft includes a power plant 10. In the example shown, the power plant may comprise a plurality of engines, specifically two engines 11 and 12.

The power plant 10 then drives rotation of the rotary wing, of the tail rotor, and of the propellers so that a power transmission system 40 is caused to move continuously.

For example, the power transmission system 40 comprises a central portion 41 driven by the power plant 10.

The central portion 41 is then connected to the tail rotor by a tail transmission shaft leading to a tail gearbox 44'.

The central portion 41 may also include a mast driving a hub of the main rotor 16.

The rotary wing and the tail rotor are then driven continuously by the power plant.

In addition, the transmission system may include one lateral portion 45 for each propeller 30 extending from the central portion towards a respective propeller. Thus, the transmission system described includes a first lateral portion 42 going from the central portion to the first propeller 31 and a second lateral portion 43 going from the central portion 41 to the second propeller 32.

It can be understood that the transmission system may be implemented in numerous ways without going beyond the ambit of the invention. Nevertheless, it is appropriate to make provision for one lateral portion per propeller, a portion for driving the rotary wing, and a portion for driving the tail rotor.

A differential mechanism 50 is then interposed between each lateral portion and its propeller firstly to enable the propeller to be driven by the associated lateral portion in certain flight configurations, and secondly to prevent the propeller being driven by the associated lateral portion in other flight configurations. Each differential mechanism 50 may be arranged in the corresponding propeller nacelle.

A first differential mechanism 50' is thus interposed between the first lateral portion 42 and the first propeller 31, with a second differential mechanism 50" being interposed between the second lateral portion 43 and the second propeller 32.

It should be observed that the assembly comprising the half-wings 21 and 22 and also the propellers 30 and the lateral portions 45 with the differential mechanism 50 may be removable.

On request, the differential mechanism enables each propeller 30 to be driven, in particular in cruising flight, while also enabling each propeller 30 not to be driven, in particular while on the ground.

It is thus possible to avoid driving the both propellers 30 while hovering, or to drive only one propeller while hovering.

Under such circumstances, the aircraft is capable of operating in particular in the following four modes:

in a first mode of operation referred to as "cruising" mode, the rotary wing, the tail rotor, and the propellers are all driven by the power plant in cruising flight;

in a second mode of operation referred to as "ground" mode, the rotary wing and the tail rotor are driven by the power plant on the ground, while the two propellers are stopped;

in a third mode of operation referred to as "hovering" mode, the power plant drives the rotary wing and the tail rotor in hovering flight, while the propellers are stopped; and in a fourth mode of operation referred to as "assisted hovering" mode, the power plant drives the rotary wing, the tail rotor, and one of the propellers in hovering flight, while the other propeller is stopped.

For this purpose, each differential mechanism 50 has an inlet gearwheel 51 that meshes with a gearwheel of the associated lateral portion 45.

The inlet gearwheel 51 is secured to a hollow shell 52, the hollow shell carrying a planet gear 54 on a support shaft 53.

The inlet gearwheel 51 and the shell 52 are then constrained to rotate together about a longitudinal axis of symmetry AX1 of the inlet gearwheel 51. Conversely, the planet gear 54 can move in translation relative to the shell 51 about a direction AX2.

Furthermore, the differential mechanism 50 is provided with an idler shaft 55 extending along a longitudinal axis of symmetry AX1. The idler shaft 55 thus passes through the inlet gearwheel.

In contrast, the idler shaft is not constrained to rotate with the inlet gearwheel 51, rolling bearing means being interposed between the idler shaft and the inlet gearwheel, for example.

A first end of the idler shaft projecting into the inside of the shell 52 is then secured to a conical inlet sun gear 56 meshing with the conical planet gear 54.

Conversely, a second end of the idler shaft co-operates with an inlet brake 65. This inlet brake 65 may comprise a jaw suitable for clamping on a shoulder 55' of the idler shaft at the request of control means 70.

Furthermore, the differential mechanism includes a propeller shaft 58 extending along a longitudinal axis of symmetry AX1. A first end portion of the propeller shaft 58 passes through the shell 52. It should be observed that the propeller shaft 58 is not constrained to rotate with the shell 52 about the longitudinal axis of symmetry AX1, rolling bearing means being interposed between the shell 52 and the propeller shaft 58, for example.

This first end portion of the propeller shaft 58 is then secured to a conical outlet sun gear 57 meshing with the conical planet gear 54. The outlet sun gear 57 is thus parallel to the inlet sun gear 56.

A second end of the propeller shaft 58 co-operates with a propeller brake 60. The propeller brake 60 may comprise a jaw suitable for clamping on a shoulder 58' of the propeller shaft 58 at the request of the control means 70.

Consequently, when the pilot operates the control means 70 to stop rotation of a propeller 30, the control means 70 prevent the propeller shaft 58 from moving with the help of the propeller brake 60 which stops the shoulder 58' of the propeller shaft 58 from moving.

In parallel, the control means 70 do not use the inlet brake 65 to impede movement of the idler shaft 55, the inlet brake not engaging the shoulder 55' of the idler shaft 55.

Consequently, the lateral portion causes the inlet gearwheel 51 to rotate about the longitudinal axis of symmetry AX1. This inlet gearwheel drives rotation of the shell 52 and of the planet gear 54 in rotation about the longitudinal axis of symmetry AX1.

The planet gear 54 then causes the inlet sun gear 56 to rotate and thus rotates the idler shaft.

The power consumed by the idler shaft is then negligible.

It should nevertheless be observed that the idler shaft 55 may mesh with an accessory gearbox 75 and/or may be connected to a kinetic energy storage system 80.

In contrast, when the pilot operates the control means 70 to drive a propeller 30 in rotation, the control means 70 prevent the idler shaft 55 from moving by means of the inlet brake 65, this inlet brake preventing the shoulder 55' of the idler shaft 55 from moving.

In parallel, the control means 70 do not use the propeller brake 60 to prevent the propeller shaft 58 from moving, the propeller brake not preventing the shoulder 58' of the propeller shaft 58 from moving.

Consequently, the lateral portion rotates the inlet gearwheel 51 about the longitudinal axis of symmetry AX1. The inlet gearwheel drives the shell 52 and the planet gear 54 in rotation about the longitudinal axis of symmetry AX1.

The planet gear 54 then sets the outlet sun gear 57 into rotation and thus rotates the propeller shaft 58.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. An aircraft comprising a fuselage, a power plant, a rotary wing having at least one main rotor providing at least part of the lift of the aircraft, a fixed wing providing at least part of the lift of the aircraft in cruising flight, said fixed wing comprising two half-wings extending on either side of the fuselage, said aircraft including at least two propulsive propellers situated on either side of the fuselage and each positioned on a respective half-wing, the aircraft including an anti-torque and yaw-control tail rotor, wherein the aircraft includes a transmission system connecting the power plant to each main rotor and to the tail rotor to drive each main rotor and the tail rotor continuously, said transmission system connecting the power plant to each propeller via a differential mechanism that is controllable on request so that each propeller may be driven in cruising flight and need not be driven in rotation by the power plant on the ground, said differential mechanism of a particular propeller comprising:
    an inlet gearwheel driven by the power plant via a lateral portion of said transmission system, said inlet gearwheel being secured to a shell carrying at least one planet gear;
    an idler shaft passing through said inlet gearwheel, said idler shaft being constrained to rotate with an inlet sun gear meshing with the planet gear and being free to rotate relative to said inlet gear;
    a propeller shaft driving said particular propeller, the propeller shaft being constrained to rotate with an outlet sun gear, the outlet sun gear meshing with the planet gear; and
    a propeller brake for braking said propeller shaft and an inlet brake for braking the idler shaft.

2. An aircraft according to claim 1, wherein the aircraft includes control means for:
    controlling the propeller brake so as to prevent the propeller shaft from rotating and controlling the inlet brake so as to release the idler shaft in order to perform a function of stopping the propeller while allowing the idler shaft to be driven by the lateral portion; and
    controlling the propeller brake to release the propeller shaft and controlling the inlet brake to block the idler shaft so as to perform a function of transmitting rotary motion from the lateral portion to the propeller shaft in order to rotate the propeller.

3. An aircraft according to claim 1, wherein said idler shaft meshes with an accessory gearbox.

4. An aircraft according to claim 1, wherein said idler shaft is connected to a kinetic energy storage system.

5. An aircraft according to claim 1, wherein said transmission system connects the power plant:
    to a first propeller via a first differential mechanism controllable by a pilot so that said first propeller can be driven by the power plant in cruising flight and in hovering flight, and need not be driven in rotation by the power plant on the ground or in hovering flight; and
    to a second propeller via a second differential mechanism controllable by a pilot so that said second propeller can be driven by the power plant in cruising flight and in hovering flight, and need not be driven in rotation by the power plant on the ground or in hovering flight.

6. An aircraft according to claim 1, wherein each half-wing extends transversely from said fuselage from a root zone towards an end zone passing via an intermediate zone carrying a propeller, said end zone being connected to said intermediate zone by a controllable hinge so that said end zone can be moved and directed towards the ground in hovering flight in order to minimize the area of the fixed wing having the air passing through the rotary wing impacting thereagainst and so as to protect the propeller from coming into contact with the ground.

7. The aircraft according to claim 1, wherein the inlet gearwheel meshes with a gearwheel of the associated lateral portion of the transmission system.

8. The aircraft according to claim 1, wherein the shell is hollow and carries the at least one planet gear within the shell on a support shaft.

9. The aircraft according to claim 1, wherein the inlet gearwheel and the shell are constrained to rotate together about a longitudinal axis of symmetry (AX1) of the inlet gearwheel; and
    wherein the at least one planet gear is configured to move in translation relative to the shell about a direction AX2 arranged at an angle with the longitudinal axis of symmetry (AX1).

10. The aircraft according to claim 9, wherein the idler shaft extends along the longitudinal axis of symmetry (AX1).

11. The aircraft according to claim 10, wherein a first end portion of the idler shaft projects into the shell and is secured to the inlet sun gear, and a second end portion of the idler shaft co-operates with the inlet brake.

12. The aircraft according to claim 9, wherein the propeller shaft extends along the longitudinal axis of symmetry (AX1).

13. The aircraft according to claim 12, wherein a first end portion of the propeller shaft projects into the shell and is secured to the outlet sun gear, and a second end portion of the propeller shaft co-operates with the propeller brake and drives said particular propeller.

14. The aircraft according to claim 1, wherein the propeller shaft is free to rotate relative to said inlet gear.

15. The aircraft according to claim 1, wherein the outlet sun gear is parallel to the inlet sun gear, the inlet and outlet sun gears rotating about an axis AX1, and the inlet gearwheel rotating about an axis AX2 generally perpendicular to the axis AX1.

16. An aircraft comprising:
    a fuselage supporting a power plant;
    a rotary wing supported by the fuselage, the wing having a main rotor providing at least a portion of the lift of the aircraft;
    an anti-torque and yaw-control tail rotor;
    a fixed wing providing at least a portion of the lift of the aircraft in cruising flight, said fixed wing having first and second half-wings, each half wing supported on a respective side of the fuselage;

first and second propulsive propellers, each propeller positioned on a respective half-wing to either side of the fuselage; and a transmission system connecting the power plant to the main rotor and the tail rotor to continuously drive the main rotor and the tail rotor, the transmission system connecting the power plant to at least one of the first and second propellers via a differential mechanism, the differential mechanism adapted to be controllable on request between a first arrangement and a second arrangement, wherein the power plant drives the propeller in cruising flight in the first arrangement, wherein the power from the power plant is interrupted in the second arrangement such that the propeller is not driven in rotation by the power plant on the ground, wherein the differential mechanism further comprises:

an inlet gearwheel driven by a portion of the transmission system extending laterally in the aircraft, a shell carrying at least one planet gear, an inlet sun gear, and an outlet sun gear, the inlet gearwheel and the shell constrained for rotation together, an idler shaft passing through said inlet gearwheel, said idler shaft being constrained to rotate with the inlet sun gear meshing with the planet gear, the idler shaft being free to rotate relative to the inlet gear, a propeller shaft driving the propeller, the propeller shaft being constrained to rotate with the outlet sun gear meshing with the planet gear, the propeller shaft being free to rotate relative to the inlet gear, a propeller brake for braking said propeller shaft, and an inlet brake for braking the idler shaft.

17. The aircraft according to claim 16 wherein the differential mechanism is a first differential mechanism connecting the transmission system to the first propeller; and wherein the transmission system has a second differential mechanism connecting the transmission system to the second propeller.

18. The aircraft according to claim 17 wherein the first differential mechanism is positioned within the first half-wing; and wherein the second differential mechanism is positioned within the second half-wing.

19. The aircraft according to claim 16 further comprising a controller configured to: (i) control the propeller brake to prevent the propeller shaft from rotating and control the inlet brake to release the idler shaft thereby stopping the propeller while allowing the idler shaft to be driven in rotation by the transmission system, and (ii) control the propeller brake to release the propeller shaft and control the inlet brake to prevent the idler shaft from rotating thereby transmitting rotary motion from the transmission system to the propeller shaft to rotate the propeller and stopping the idler shaft.

* * * * *